United States Patent [19]

Anderson et al.

[11] 3,729,074
[45] Apr. 24, 1973

[54] PARKING BRAKE CONTROL WITH TRANSMISSION INTERLOCK

[75] Inventors: Rodney H. Anderson, Naperville; Ralph R. Day, Aurora, both of Ill.

[73] Assignee: Caterpillar Tractor Co., Peoria, Ill.

[22] Filed: June 14, 1971

[21] Appl. No.: 152,712

[52] U.S. Cl. ............... 192/4 C, 74/480 R, 188/72.9
[51] Int. Cl. ............................................ B60k 29/02
[58] Field of Search .................. 192/4 B, 4 C, 4 A

[56] References Cited

UNITED STATES PATENTS

| | | | |
|---|---|---|---|
| 3,390,523 | 7/1968 | Heidemann et al. | 192/4 B X |
| 3,645,368 | 2/1972 | Blaavw | 192/4 C |
| 3,349,860 | 10/1967 | Ross | 192/4 B X |
| 2,964,135 | 12/1960 | Sand | 192/4 A X |
| 1,999,284 | 4/1935 | Colvin | 192/109 A X |
| 3,498,425 | 3/1970 | Takada | 192/4 A |
| 3,539,040 | 11/1970 | Edwards | 192/4 B |
| 3,618,718 | 11/1971 | Blaavw | 192/4 B |

*Primary Examiner*—Benjamin W. Wyche
*Attorney*—Charles M. Fryer et al.

[57] ABSTRACT

A control system for a vehicle having a parking brake and a transmission is provided with means cooperating with the transmission controls to bias the transmission into a neutral condition when the parking brake is applied. The cooperating control means coact to shift the transmission to a neutral position if the parking brake is applied with the transmission in either a forward or reverse drive condition. A resilient biasing means is employed to provide a manual override to enable the transmission to be manually held in an operating condition with the parking brake engaged.

2 Claims, 2 Drawing Figures

Patented April 24, 1973

INVENTORS
RODNEY H. ANDERSON
RALPH R. DAY

BY
ATTORNEYS

INVENTORS
RODNEY H. ANDERSON
RALPH R. DAY

BY

ATTORNEYS

PARKING BRAKE CONTROL WITH TRANSMISSION INTERLOCK

BACKGROUND OF THE INVENTION

This invention relates to a parking brake control system, and pertains more particularly to a control system on a vehicle interconnected for effecting automatic disengagement of a transmission upon application of the vehicle parking brake, and including means for manual override to hold the transmission in gear while the brake is engaged.

It is customary in vehicle designs to provide a parking brake which also functions as an emergency brake. Many of the present day vehicles have engines of sufficient torque to overpower the parking brake. To prevent this from occurring, some vehicles are provided with parking brake controls which coact with the transmission controls to shift the transmission to neutral when the parking brake is applied. Examples of such prior known systems are shown in the following U.S. patents: (a) U.S. Pat. No. 3,480,120 issued Nov. 25, 1969; (b) U.S. Pat. No. 3,050,165 issued Aug. 21, 1962; and (c) U.S. Pat. No. 3,181,667 issued May 4, 1965.

The arrangements to date generally effect positive interlock so that the parking brake control must be shifted to the release position before the transmission can be shifted to an operating position. Although this feature is desirable, there are some emergency situations where it is beneficial to be able to engage the transmission without releasing the parking brake mechanism. One such instance is when the parking brake is used as an emergency brake should a failure occur in the primary braking system. If the parking brake is not properly adjusted, or if the vehicle is negotiating adverse grades, the parking brake may not have sufficient braking capacity to stop the machine and the operator may instinctively try to shift the transmission to a reverse gear to help control the vehicle. With the currently commercially available arrangement, the transmission cannot be engaged while the parking brake is applied and thus the braking action afforded by the transmission reversal cannot be utilized concurrently with the parking brake for such emergency situations.

SUMMARY AND OBJECTS OF THIS INVENTION

In accordance with the present invention, a parking brake control system includes means which coact with the transmission control linkage to shift the transmission to a neutral position when the parking brake is applied. The system includes biasing means to normally restrain the transmission in neutral when the parking brake is engaged, and a manual override to allow the transmission control to be manually forced and held in an operating position against the biasing force of the resilient means.

Accordingly, it is an object of the present arrangement to provide a means to bias the transmission of a vehicle into neutral while the parking brake is engaged to prevent the machine from being driven inadvertently with the parking brake engaged.

Another object of this invention is to provide a means to automatically shift a vehicle transmission to neutral when the parking brake is applied should the transmission be in an operating position at the time the parking brake is applied.

It is a further object of this invention to incorporate a resilient means to allow the operator to manually force and hold the transmission in an operating position while the parking brake is applied.

BRIEF DESCRIPTION OF THE DRAWINGS

Other objects of this invention will become apparent from the following description and accompanying drawings wherein.

DESCRIPTION OF THE PREFERRED EMBODIMENTS

Figure 1:
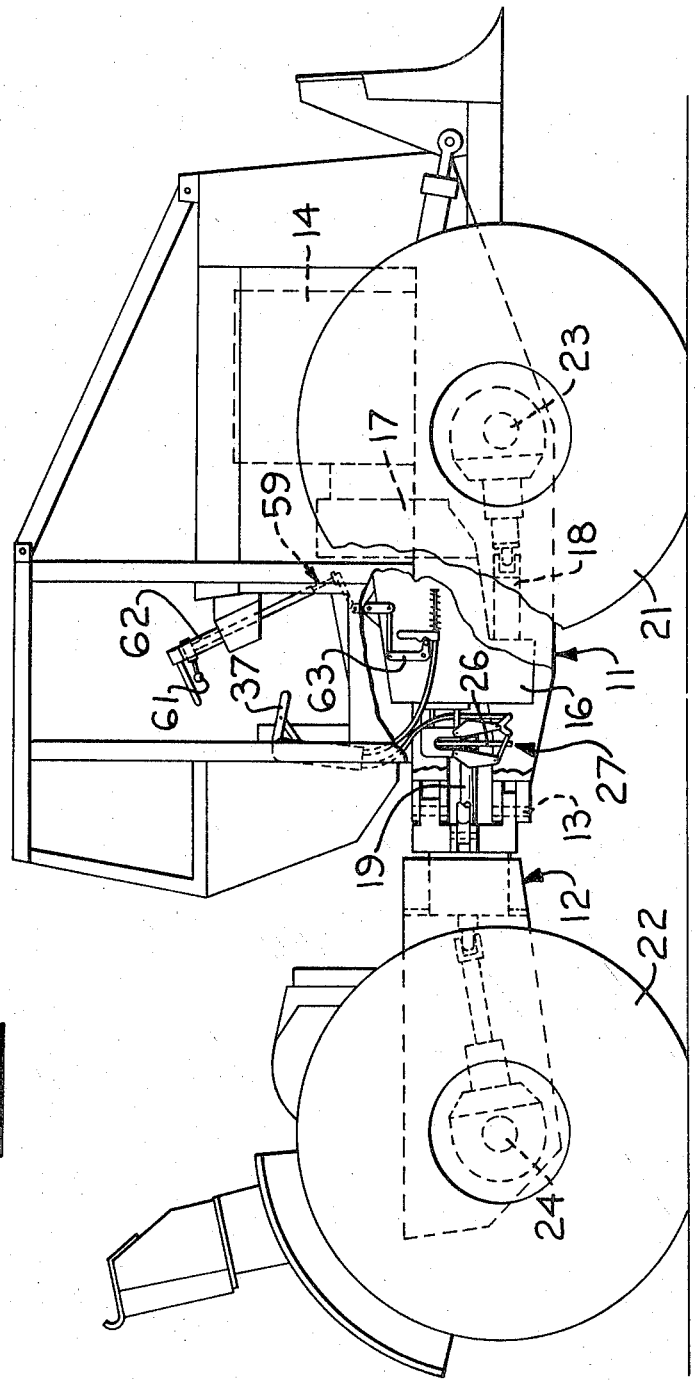
FIG. 1 is a side elevational view of a vehicle employing a preferred embodiment of the present invention with portions broken away to show details.

Referring now to FIG. 1, the invention is illustrated as being incorporated in a four-wheeled articulated vehicle which has a front frame 11 and a rear frame 12 connected together at 13 for pivotal movement about a substantially vertical pivot axis. The front frame 11 carries an engine 14 which is drivingly connected to a transmission 16 through a torque converter 17. The transmission 16 is of conventional construction wherein the speeds and direction are changed by a hydraulic control system in a conventional manner. The transmission 16 has interconnected output shafts 18 and 19 which are connected to front and rear drive wheels 21 and 22 through drive axles 23 and 24. The output shaft 19 carries a brake disc 26 of a parking brake apparatus 27. Since the output shaft 18 and 19 are interconnected for rotation with one another, application of the parking brake 27 is effective to stop rotation of all four wheels of the vehicle.

Figure 2:
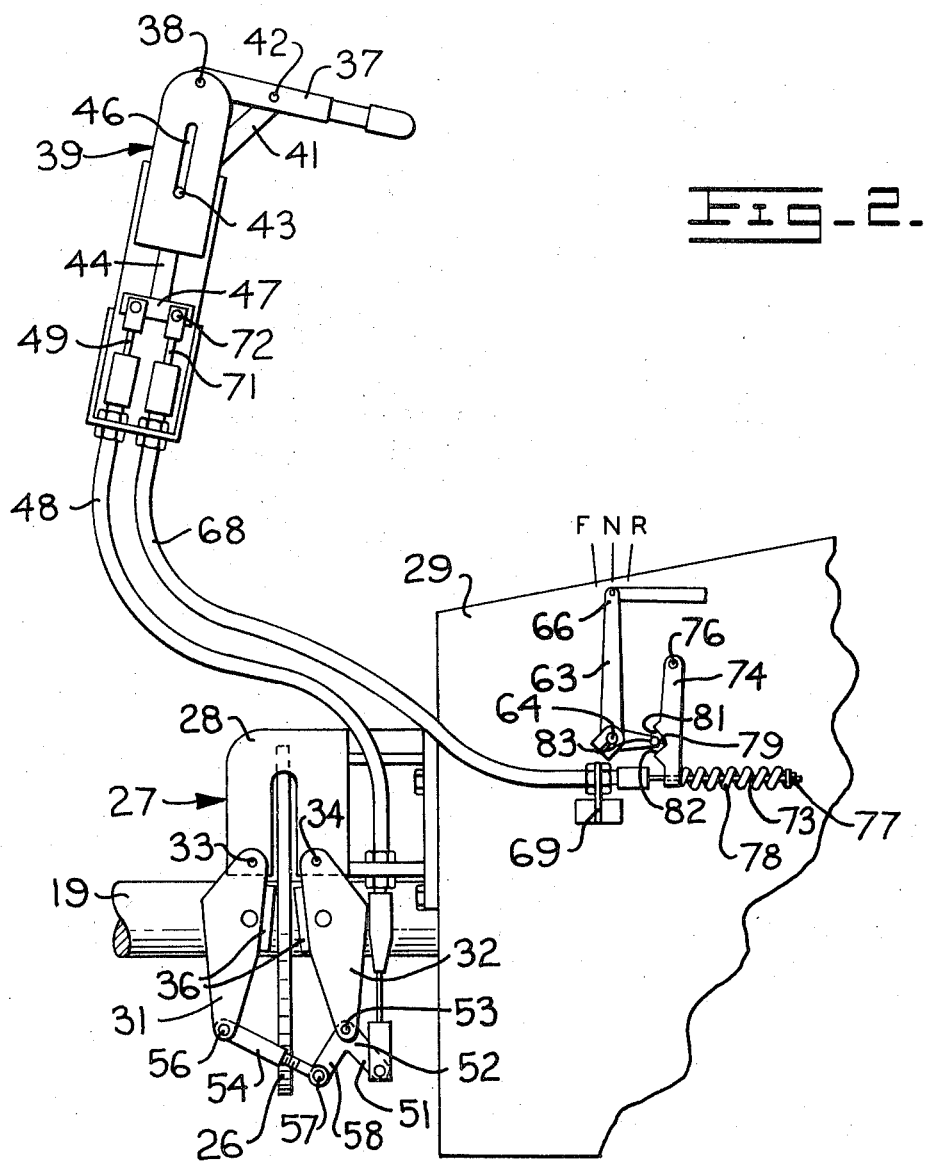
FIG. 2 is a detailed view of the preferred embodiment of the present invention.

As more clearly shown on FIG. 2, the parking brake apparatus 27 comprises a mounting bracket 28 secured to the rear of a transmission housing 29. A pair of levers 31 and 32 pivotally attached to the bracket 28 at 33 and 34 carry conventional brake pads 36 whereby pivotal movement of levers 31 and 32 toward one another cause the pads 36 to clamp against the disc 26 to stop rotation thereof.

The parking brake apparatus 27 is operated through a manual control linkage which includes a manually-operated lever 37 pivotally attached at 38 to a housing 39. A link 41 attaches to lever 37 at 42 and at 43 to a rod 44 which is reciprocally contained inside the housing 39. The housing 39 is provided with a slot 46 for guiding the movement of the lower end of link 41 when the lever is pivoted about pivot 38. The rod 44 extends downwardly through the housing and projects from the bottom thereof terminating with a connection to a cross-bar 47.

The parking brake control linkage also includes a push-pull cable 48 having one end secured to the housing 39 and the other end secured to the bracket 28 in a conventional manner. One end of a central rod member 49 of the push-pull cable 48 is pivotally attached to the cross-bar 47 while the other end is pivotally attached to an arm 51 of a bellcrank 52 which is pivotally secured at 53 to the lower end of lever 32. An adjustable link 54 is pivotally connected to the lower end of lever 31 at 56 and at 57 to a second arm 58 of bellcrank 52.

To apply the brake, the lever 37 is pivoted counterclockwise about its pivot 38 causing link 41 to move the rod 44 upward. The upward movement of rod 44 pulls the central rod member 49 through the push-pull cable 48 and thereby rotates bellcrank 52 counterclockwise causing the levers 31 and 32 to move the brake pads 36 toward one another and clamp against the disc 26 to stop rotation thereof.

The transmission control means comprises a manually-operated linkage 59 for shifting the hydraulic control valves (not shown) which are integral parts of the transmission 16. The control linkage includes a manual shift lever 61 mounted adjacent a steering column 62 and a lever 63 secured to a shaft 64 which extends through the transmission housing 29. The opposite end of shaft 64 is operatively connected to the internally-mounted control valve. Manipulation of shift lever 61 results in pivotal movement of an end 66 of lever 63 to one of the three positions indicated by the letters F, N and R which correspond to "forward," "-neutral," and "reverse" conditions of the transmission.

A second push-pull cable 68 has one end secured to the bottom of housing 39 and the other end secured to a bracket 69 fastened to the transmission housing 29. A first end of the central rod 71 of cable 68 is attached at 72 to cross-bar 47 while a second end 73 extends through a lever 74 which is pivotally mounted to the housing 29 at 76. The second end 73 of rod 71 terminates with a nut 77 which retains a coil spring 78 disposed between the lever 74 and the nut 77. The lever 74 includes a V-shaped notch 79 defined by two converging caming surfaces 81 and 82 which cooperate with an abutment portion 83 of lever 63 of the transmission control linkage 59 to bias the lever 63 to and retain it in the neutral position as shown when the parking brake is engaged. When the lever 63 is in the position shown, actuation of the parking brake linkage to apply the brake will cause the central rod 71 of cable 68 to be pulled through the cable 68 thereby causing the spring 78 to exert a force on the lever 74 which rotates clockwise about pivot 76 until the V-shaped notch 79 engages the abutment portion 83 of lever 63 and the transmission control linkage will be restrained in the neutral position until the parking brake is released. Thus, inadvertent operation of the vehicle with the parking brake applied will be prevented.

If the transmission control linkage and lever 63 is in either the forward or reverse positions indicated by F and R and the parking brake is applied, one of the caming surfaces 81 or 82 will engage the cooperating abutment portion 83 of lever 63 and force the transmission control linkage into its neutral position as lever 74 is pivoted clockwise about pivot 76. When the lever 74 is in the position shown on FIG. 2, the transmission control linkage and lever 63 can be shifted to either of the drive establishing positions F or R without interference.

Under normal circumstances, the above-described mechanism is effective to prevent the vehicle from being inadvertently operated with the parking brake applied. However, in an emergency situation such as if the primary brakes have failed, it may be desirable to utilize the braking action afforded by the engine or the reversal of the transmission in conjunction with the braking action of the parking brake apparatus to control the vehicle. In this situation the operator can manually force the transmission control linkage to an operating position whereby the lever 74 is forced counterclockwise against the bias of spring 78. When the emergency situation is passed, the operator releases the shift lever 61 and the spring 78 will again force the lever 74 clockwise to shift the transmission lever 63 to the neutral position.

What is claimed is:

1. A control system for operatively interconnecting a parking brake control having an actuated position and a release position, and a transmission control shiftable between a neutral, and forward and reverse drive positions; said control system comprising:

a brake actuating control lever;

a transmission shift member;

means operatively connected to said brake control lever and operative when said brake control lever is in said actuated position to force said shift lever to a neutral position;

said means to force said shift member comprises camming means including camming surfaces defined by a substantially V-shaped notch carried on a lever mounted adjacent to said shift member for operative engagement with an arm extending from said shift member into the space between said camming surfaces;

resilient means connecting said brake control lever to said cam lever;

said resilient means comprises a flexible cable, and, a compression spring mounted on said cable between a stop at the end thereof and said lever so that said resilient means functions as a lost motion connection.

2. A control system for operatively interconnecting a parking brake control having an actuated position and a release position, and a transmission control shiftable between a neutral, and forward and reverse drive positions; said control system comprising:

a brake actuating control lever;

a transmission shift member;

means operatively connected to said brake control lever and operative when said brake control lever is in said actuated position to force said shift lever to a neutral position;

said means comprising cam means carried on a pivotal arm;

a resilient cable including a compression spring mounted on the end of said cable between a stop member and said pivotal arm connecting said control lever to said arm; and, an arm extending from said shift member for engagement with said cam means.

* * * * *